United States Patent [19]

Thiessen

[11] Patent Number: 5,123,949
[45] Date of Patent: Jun. 23, 1992

[54] METHOD OF INTRODUCING ADDIVITES TO FIBROUS PRODUCTS

[75] Inventor: Leo K. Thiessen, Littleton, Colo.

[73] Assignee: Manville Corporation, Denver, Colo.

[21] Appl. No.: 755,956

[22] Filed: Sep. 6, 1991

[51] Int. Cl.⁵ .............................................. C03B 37/00
[52] U.S. Cl. .......................................... 65/4.4; 65/9; 264/6; 264/8; 264/115; 264/122
[58] Field of Search .................. 264/6, 8, 122, 121, 264/211.1, 115; 65/4.4, 6, 8, 9, 5, 3.43, 14; 156/167, 62.2

[56] References Cited

U.S. PATENT DOCUMENTS

| | | | |
|---|---|---|---|
| 2,904,453 | 9/1959 | Labino | 65/4.4 |
| 2,931,422 | 4/1960 | Long | 65/4.4 |
| 3,020,585 | 2/1962 | Berthon et al. | 65/4.4 |
| 3,030,659 | 4/1962 | Slayter | 65/14 |
| 3,218,139 | 11/1965 | Lincoln et al. | 65/5 |
| 3,616,030 | 10/1971 | Jumentier et al. | 65/4.4 |
| 3,850,601 | 11/1974 | Stapleford et al. | 65/4.4 |
| 4,201,247 | 5/1980 | Shannon | 65/4.4 |
| 4,832,723 | 5/1989 | Shisler | 65/14 |
| 4,865,755 | 12/1989 | Lloyd | 252/91 |

FOREIGN PATENT DOCUMENTS 2173523 10/1986 United Kingdom ............... 65/4.4

Primary Examiner—Mary Lynn Theisen
Attorney, Agent, or Firm—Cornelius P. Quinn

[57] ABSTRACT

A process for introducing additive particles to extruded fibers during production of the fibers. Particles are directed into a moving stream of fibers during or after the fiber attenuation process. The movement of the fibers intermingles the particles with the fibers prior to the intermingled material being collected on a moving support. If liquid binder is sprayed onto the fibers it is subsequently set in an oven to bind the fibers and the particles to each other. The fibers preferably are mineral fibers and the particles may be fibers or particles introduced for a variety of reasons, such as to increase the strength of the product or to serve as extenders or fillers.

10 Claims, 3 Drawing Sheets

METHOD OF INTRODUCING ADDIVITES TO FIBROUS PRODUCTS

FIELD OF THE INVENTION

This invention relates to the production of fibrous products. More particularly, it relates to the production of fibrous products which incorporate ingredients other than the base fibers.

BACKGROUND OF THE INVENTION

Mineral fiber products are commonly produced by melting the base mineral material and then fiberizing the molten liquid. The primary fibers so produced are attenuated into smaller diameter fibers of finite length which typically are deposited onto a moving support or collection surface to form a mass or layer of uniformly distributed intertwined fibers. Liquid binder sprayed on the fibers as they move toward the support is subsequently set or cured in an oven through which the layer of fibers passes. The layer is often compressed to a predetermined density prior to the setting of the binder.

Because many of the properties of fibrous products produced in this manner are limited by the properties of the base fibers themselves, it would at times be beneficial to modify the products in order to alter or enhance those properties, to add strength to the products, to reduce costs or to modify density or other properties. A major problem encountered in introducing additive materials, however, is the difficulty in uniformly distributing them throughout the fibrous matrix. If liquid additives are not sticky, they may be difficult to adhere to the fibers when sprayed onto the fibers as they move toward the collection surface. If liquid additives are sprayed onto an already formed fibrous mass, it is difficult to uniformly disperse them throughout the mass. It is even more difficult to add solid additives to a layer or mass of collected fibers so as to uniformly penetrate and become dispersed throughout the mass. If the particular additive desired to be added is available only in solid form, the present state of the art of introducing it to the fibrous product dictates against such addition.

It would therefore be highly desirable to be able to introduce solid particles to a fibrous product in such a way that the particles are uniformly distributed throughout the product. Further, the method of introduction should be such that it does not adversely affect the production of the base fibers or interfere with the normal collection and depositing of the produced fibers. In addition, the cost of introducing additives should be minor so as not to be a deterrent to the additive project.

SUMMARY OF THE INVENTION

The process of the invention applies generally to methods for producing a body of fibers from material capable of being fiberized. The material is heated and liquified, then fiberized in accordance with known procedures, and the resulting fibers are moved toward a support. Particles of additive material are introduced to the moving fibers so as to substantially uniformly intermingle with the moving fibers. A layer of the intermingled fibers and additive particles is then collected on the support. A heat curable liquid binder may also be added to the moving stream or column of intermingled fibers and additive particles and the mass of collected material may be subjected to heat to cure the binder to bind the various ingredients together.

The process of the invention is specifically applicable to the rotary method of forming mineral fibers whereby liquid mineral material introduced into a spinning rotor having a sidewall containing openings is extruded through the openings by centrifugal force. In such a process the fibers are attenuated by means of a downwardly directed gaseous blast, and the fibers move toward the support in column form. According to the invention, particles of additive material are intermingled with the fibers in the column by being hurled outwardly from a location within the column. The particles preferably are introduced into the column through a hollow shaft on which the rotor is mounted.

The process of the invention is also specifically applicable to the flame attenuation method of producing mineral fibers whereby primary fibers are pulled through holes in the bottom of a pot containing molten mineral material and are then attenuated by means of a flame which produces expanding gases and moves the fibers in a stream toward a collection or support surface. The particles of additive material are generally uniformly intermingled with the fibers by being introduced into the stream of fibers, the velocity of the expanding gases mixing the particles with the fibers in the stream.

The particles may include fibers other than the base fibers, as long as they can be introduced and intermingled with the base fibers in the manner described, or they may be particles which themselves melt when exposed to the heat of the binder curing oven. Whatever the actual make-up of the additive particles introduced, through the method of the invention the physical or performance characteristics of the ultimate fibrous product being produced can be modified or designed specifically for the desired end use.

DETAILED DESCRIPTION OF THE PREFERRED EMBODIMENTS

Figure 1:
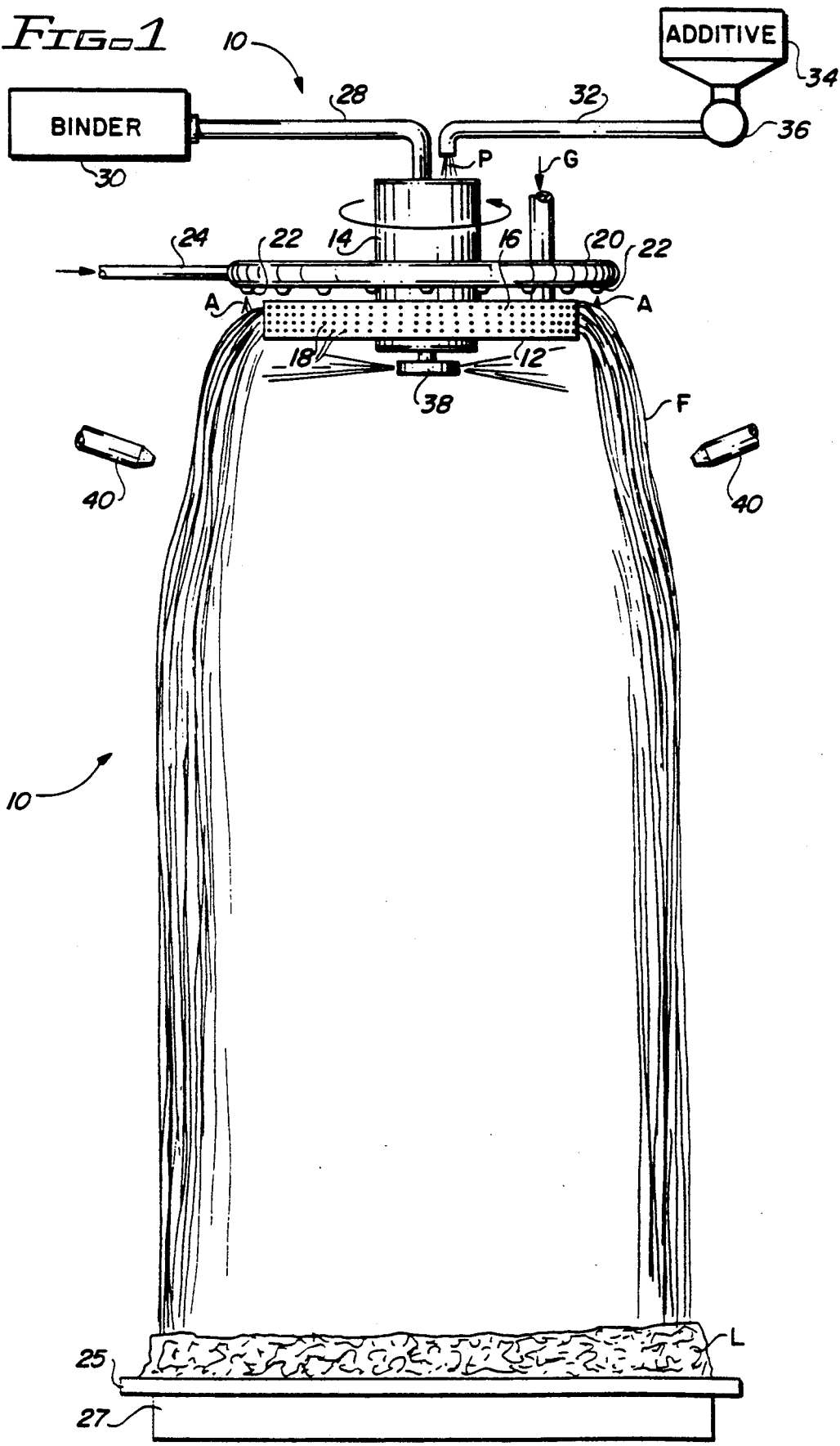
FIG. 1 is an end elevation, partially in schematic form, of apparatus for carrying out the invention in connection with a rotary fiber manufacturing process.

Referring to FIG. 1, a rotary spinner assembly 10 is comprised of a disc 12 connected to a rotary shaft 14 driven by a suitable drive train, not shown. The disc includes a sidewall 16 which contains a myriad of small holes or orifices 18. The upper end of the disc is open to the continuous flow of a stream of molten material, such as glass G, which is directed by the centrifugal force created by the spinning disc toward the sidewall 16 and extruded through the openings 18. Normally, heating means, not shown, are provided in close proximity to the interior of the disc for the purpose of maintaining the molten glass in the desired temperature range. Mounted above and radially outwardly of the disc 12 is a hollow ring 20 containing a number of spaced nozzles 22 to which air under pressure is supplied through an inlet 24. Upon striking the fibers F exiting from the spinner holes 18, the high pressure air stream A strikes the fibers, further attenuating them and directing them down toward a moving porous collection belt or chain 25. A suction box 27 is shown directly beneath the chain to cause the fibers to better adhere to the chain, where they build up to form a layer or blanket L. The structure described thus far is known in the art.

Figure 2:
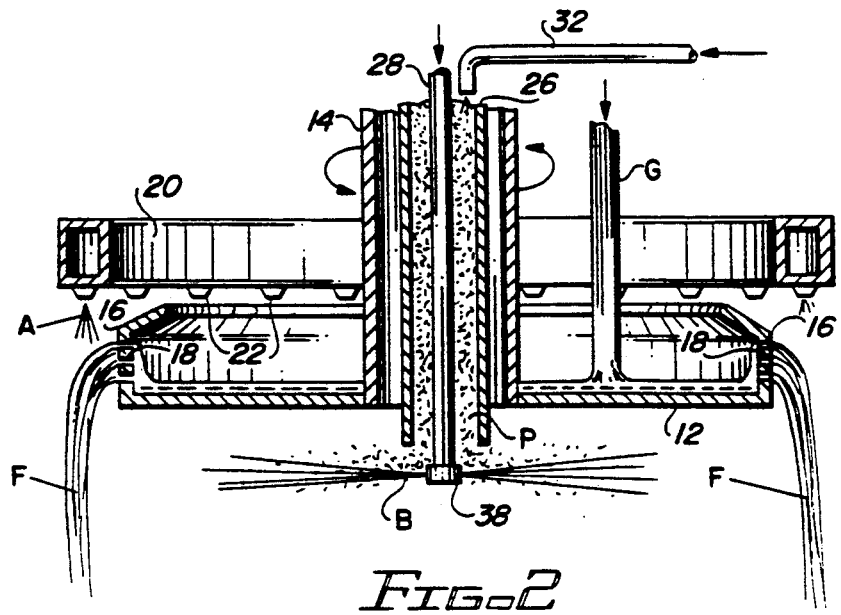
FIG. 2 is an enlarged partial vertical sectional view of the spinner of FIG. 1 and the means for introducing additive particles.

Still referring to FIG. 1, and also to FIG. 2 for a more detailed showing of the structure, it will be seen that the rotating shaft 14 is hollow, with a fixed tube 26 mounted axially within the hollow shaft. The lower end of the tube 26 extends down below the surface of the spinner disc 12. Mounted axially within the tube 26 is another smaller tube 28 which extends down below the end of the tube 26. The tube 28 is connected to a source of liquid resin binder 30, and a conduit 32 is connected to a source of additive particles 34. The source of additive particles, which may be any suitable hopper or bin, is shown as being connected to the conduit 32 through a suitable blower or air assist device 36. The conduit 32 is positioned so that particles P are deposited in the annulus between the tube 26 and the binder tube 28. Mounted on the end of the tube 28 is a nozzle 38 capable of spraying liquid binder radially outwardly in a full 360° spray.

In operation, additive particles P are delivered at a rate which will result in a predetermined amount being incorporated within the fibrous layer L. The pressure forces and currents beneath the rotating disc cause the particles exiting the tube 26 to flow generally radially outwardly. At the same time, liquid binder B is sprayed from the nozzle 38 so that a portion of the binder spray contacts and adheres to the outwardly flowing particles P. Even though some of the binder is intercepted by the additive particles, enough binder is normally introduced so that a sufficient amount reaches all the fibers F moving toward the collection chain 25. The resulting layer L of intermingled binder-coated fibers and additive particles form a generally uniform mixture, the additive particles thus being able to provide their particular characteristics uniformly throughout the fiber glass matrix. If desired, liquid binder may also be sprayed from the nozzles 40 shown in FIG. 1, located externally of the fiber column to ensure that the fibers near the outer portions of the column are contacted by an adequate amount of binder.

Figure 3:
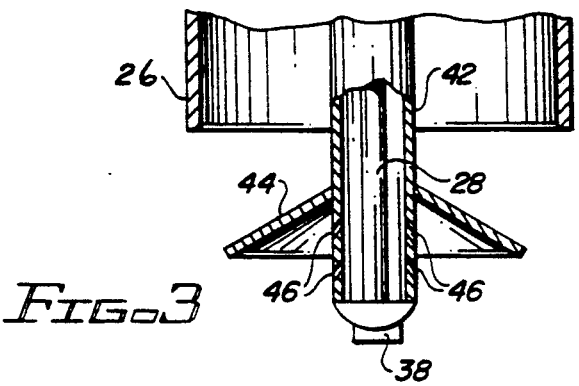
FIG. 3 is an enlarged vertical sectional view of the lower end portions of the binder and additive feed tubes, showing a modification of the structure of FIG. 2.

Pressurized air may also be supplied to assist in controlling the shape of the column of falling fibers F as well as to assist the stream of additive particles to flow radially outwardly toward the fiber column. To accomplish this, a tube 42 surrounding the binder tube 28 in FIG. 3 is provided with a collar 44 in the shape of a truncated cone located beneath the bottom end of the tube 26. The bottom of the tube 42 is closed except for an aperture, not shown, through which the binder tube passes. The nozzle 38 is thus positioned beneath the closed end of the tube 42. In addition, the wall of the tube 42 between the collar 44 and the nozzle 38 includes apertures 46 through which air may flow. As shown, the apertures are directed at a downward angle to the horizontal to facilitate the flow of air therethrough. In this arrangement, binder is delivered to the nozzle 38 through the binder tube 28, and air under pressure is delivered to the apertures 46 through the annulus between the tubes 28 and 42. The delivery of pressurized air in this manner assists in establishing the desired radially outward flow of additive particles, and also acts to expand the diameter of the fiber column, which is desirable from the standpoint of uniformly distributing the materials onto the collection chain. The collar 44 prevents binder and fiber build-up on the binder nozzle and also acts to outwardly divert additive particles which may strike it.

Figure 4:
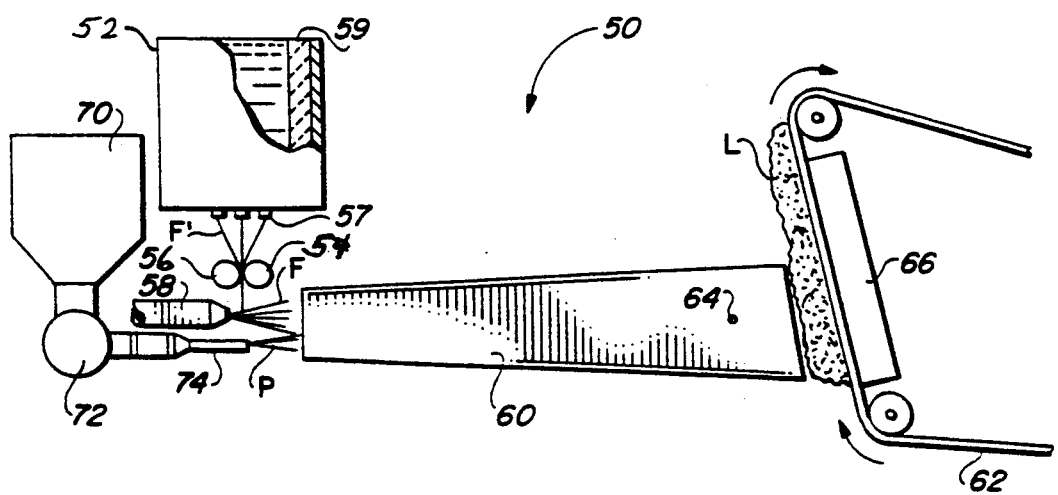
FIG. 4 is a side elevation, with portions shown in section and in schematic form, of apparatus for carrying out the invention in connection with a flame attenuation fiber manufacturing process.

As pointed out above, the invention can also be incorporated in the flame attenuation method of forming mineral fibers. Referring to FIG. 4, the apparatus 50 comprises a pot 52 from which primary fibers F' of molten glass are drawn by rollers 54 and 56 through bushing nozzles 57 in the bottom wall of the pot. As is well known in the fiber glass manufacturing industry, the pot 52 is lined with refractory insulation 59 which permits glass marbles or chips to be heated to the melting point in the pot by burners, not shown, and allows the glass to stay in a molten state during its tenure in the pot. A burner 58 positioned adjacent the fibers as they exit the rollers emits a flame which attenuates the primary fibers F' into smaller diameter secondary fibers F of finite length. The fibers are impelled by the high velocity hot gases of the flame through a forming tube 60 which directs the fibers to a moving collection belt or chain 62. Binder nozzles 64 typically are mounted on opposite walls of the forming tube in order to spray liquid binder on the fibers prior to the fibers reaching the collection chain. A suction box 66 mounted on the opposite side of the chain causes the fibers to collect on and remain adhered to the chain. As the chain moves away from the end of the forming tube a layer L of collected fibers moves with it to a downstream oven, not shown, where the liquid binder is cured. Although not shown, it will be understood by those skilled in the fiber forming art that a number of forming tubes from a number of fiber production units may lead into a common collection chamber through which the collection chain moves.

Figure 5:
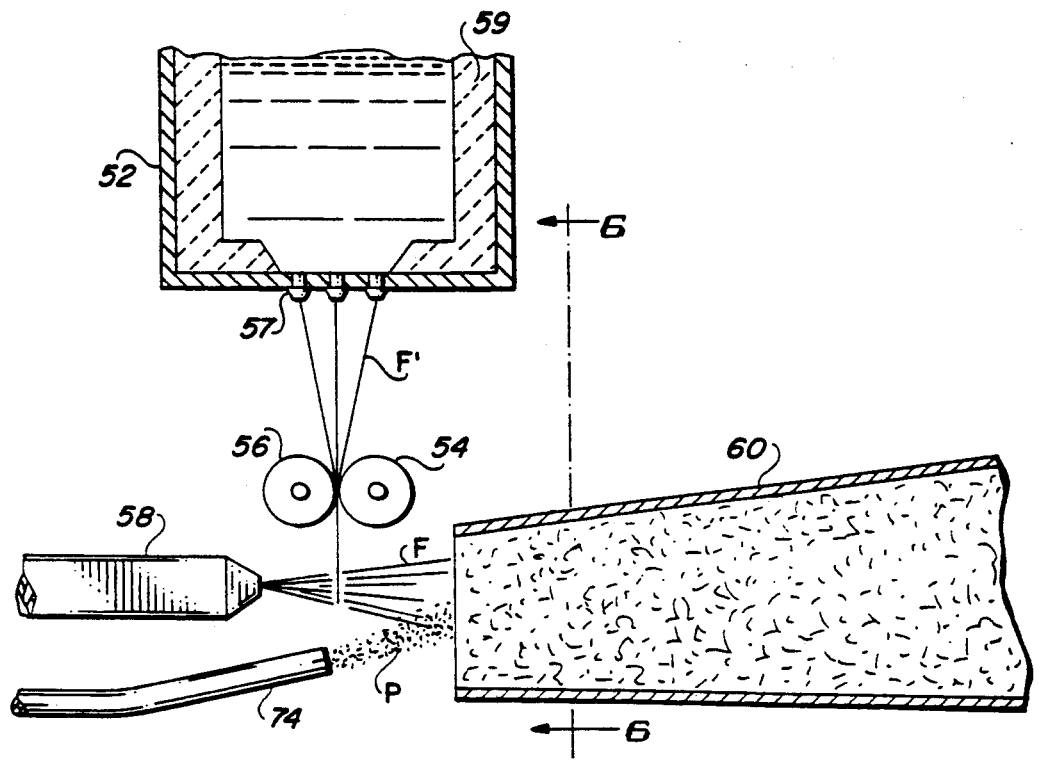
FIG. 5 is an enlarged partial vertical sectional view of the fiber forming section and the means for introducing additive particles.
Figure 6:
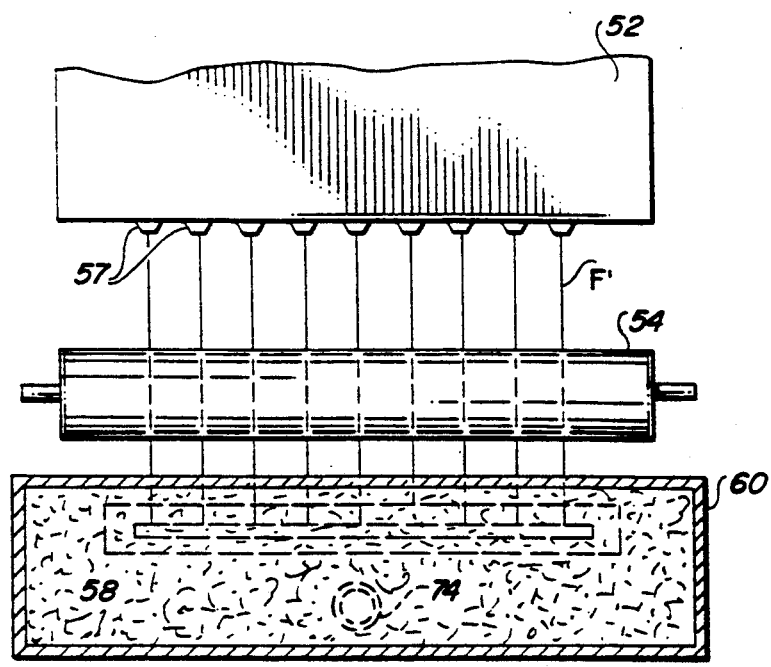
FIG. 6 is a transverse sectional view taken on line 6—6 of FIG. 5.

In accordance with the invention, a bin or hopper 70 is provided for holding solid additive particles, and an air assist means or mover 72 is connected to the hopper outlet in order to move predetermined amounts of particles through a conduit 74. As best shown in FIGS. 5 and 6, the end of the conduit 74 is located beneath the burner 58 at a location and at an angle which causes particles P to be delivered into the stream of hot gases generated by the burner. This causes the particles to mix with the secondary fibers F in the forming tube 60 and to be uniformly distributed throughout the fibrous layer L on the collection chain. As shown in FIGS. 4 and 5, solid particles of additive material are introduced into the moving stream of fibers by entraining the particles in a stream of air having a major component of movement in the same direction as the direction of movement of the stream of attenuated fibers. Both the fibers and additive particles are coated with liquid binder sprayed through the nozzles 64 shown in FIG. 4.

The invention permits additives of various types to be added in solid form and to be uniformly dispersed throughout the glass or other mineral fiber. Particles such as powders or finely granulated materials may be added for a variety of reasons. For example, lightweight particles which are themselves good insulating material, such as expanded volcanic ash, expanded perlite or vermiculite, can function as an extender, replacing predetermined amounts of fiber. Although this can result in a slight reduction of insulating value at certain densities, fibrous products containing particulate extenders introduced in accordance with the invention have generally the same insulating value as products which do not contain extenders. The addition of additives can have a material cost benefit, where the material added is less expensive than the fibers produced in the process, and it can also have the overall cost benefit of allowing the speed of the production line to be increased beyond the speed which normally is dictated by the production rate of the fibers.

Additive particles may also be introduced for the purpose of imparting specific properties to the fibrous product. In other cases it may be desirable to increase the product density beyond the limits normally imposed by the fiber manufacturing process, in which case additives such as perlite ore or other heavier mineral particles can be used to provide extra product weight at minimal cost.

The term "particle" when applied to additives suitable for use in the invention is not limited to powders or grains, but also applies to fibers. For example, expanded perlite, fluffed bleached and unbleached wood pulp or fibrated newsprint may be added to function as an extender for the reasons discussed above in connection with lightweight additives. Such a product would find use, for example, in the manufacture of blowing wool. Edge trim or scrap, containing cured or uncured binder and otherwise unusable as an ingredient in fibrous products manufactured by conventional processes, may be added by the method of the invention as a cost reduction step and as a means for recycling scrap material.

Resin in particulate form may be added instead of or in addition to the application of liquid resin. This is of particular benefit to products which are formed with the resin binder at the B-stage of curing, with final curing taking place at the time the final product is formed in a molding process. By employing solid resin powder or flakes instead of liquid binder, problems of handling due to tackiness, insufficient resin content in the product as a result of attempting to minimize tackiness, and inadequate shelf life can be overcome.

It will be appreciated that the amounts of additives introduced to the fiber stream will vary depending upon the specific additive being used and the qualities it is intended to impart. In cases where it is intended to substitute relatively large amounts of extenders or scrap fiber for the base fiber, quite large amounts are desirable. These additives may typically be present in the product up to about 70%, by weight, with 40% being a commercially practicable maximum amount.

The amount of additive introduced is also dependent upon the ability of the delivery system to handle the necessary flow rate of the additive. This requires the delivery conduit and air assist means to be adequately sized and the additive material itself to be flowable or capable of being fluidized. In the case of fiber additives, the length of the fibers is determined by these considerations and also by the function they are to perform in the fibrous product. If added as an extender, as in the case of newsprint fibers, for example, the fiber additive is preferably finely ground to a size capable of passing through screens having openings in the range of 5/64 inch to 7/16 inch. A more commercially practicable range, however, would be from $\frac{1}{8}$ inch to $\frac{1}{4}$ inch. This not only facilitates its introduction into the fibrous matrix, but also facilitates its uniform distribution throughout the product. If added for the purpose of reinforcing the fibrous matrix, as in the case of fibers introduced to improve the tensile strength of the product, the additive fibers would preferably have a length in the range of $\frac{1}{8}$ inch to $\frac{3}{4}$ inch. Still longer fibers, even up to about 2 inches in length, may be added in small amounts. It will be understood that the quantity of the added fibers depends on their length, restricting long fibers to lesser amounts and allowing shorter fibers to be added in greater amounts. If added for the purpose of improving resistance to high temperatures, as in the addition of ceramic or refractory fibers to a fiberglass based product, the length of the fibers added would be the typical length of such fibers when used as the principal fibers in the formation of high temperature products. When adding edge trim or scrap material comprised of the same base fiber, the material preferably should be opened at least to the extent necessary to eliminate clumps or wads.

Although various types of additives have been discussed as being suitable for addition to a fibrous product during the fiber forming operation, it will be understood that the invention is not limited to the addition of only a single additive at a time. Combinations of different additives may be introduced in order to impart their particular desirable properties to the product. For example, both newsprint fibers and expanded pumicite could be added to the moving attenuated base fibers, either in previously mixed form or in separate streams by means of multiple delivery conduits.

The invention is obviously not intended to preclude the addition of liquid additives, but to enlarge the scope of additives to include solid materials previously incapable of being reliably introduced into the fibrous matrix in a consistent, uniform and economical manner.

It should be apparent that the invention need not necessarily be limited to all the specific details described in connection with the preferred embodiments, but that changes to certain features of the invention which do not alter the overall basic function and concept of the invention may be made without departing from the spirit and scope of the invention as defined in the appended claims.

What is claimed is:

1. A process for producing a fibrous body, comprising the steps of:
    heating material capable of being fiberized to its softening point to liquefy the same;
    introducing the liquefied material into a spinning rotor having a sidewall containing openings therein whereby the liquid material is extruded through the openings by centrifugal force to form primary fibers;
    attenuating the primary fibers by means of a gaseous blast to cause the attenuated fibers to move toward a support in a column;
    introducing solid particles of additive material to the moving column of fibers by hurling the particles from a point within the column substantially uniformly radially outwardly into the column to thereby intermingle the particles with the fibers;
    introducing heat curable liquid binder to the moving intermingled fibers and additive particles;
    collecting a layer of the intermingled fibers and additive particles on the support; and
    heating the layer of fibers, additive particles and liquid binder to cure the binder.

2. A process for producing a fibrous body, comprising the steps of:
heating material capable of being fiberized to its softening point to liquefy the same;
introducing the liquefied material into a spinning rotor having a sidewall containing openings therein whereby the liquid material is extruded through the openings by centrifugal force to form primary fibers;
attenuating the primary fibers by means of a gaseous blast to cause the attenuated fibers to move toward a support in a column;
introducing solid particles of additive material to the interior of the column of fibers through a rotating hollow shaft on which the rotor is centrally mounted;
hurling the particles outwardly into the column of fibers to thereby intermingle the particles with the fibers;
introducing heat curable liquid binder to the moving intermingled fibers and additive particles;
collecting a layer of the intermingled fibers and additive particles on the support; and
heating the layer of fibers, additive particles and liquid binder to cure the binder.

3. A process for producing a fibrous body, comprising the steps of:
heating material capable of being fiberized to its softening point to liquefy the same;
introducing the liquefied material into a pot having holes in the bottom thereof;
continuously pulling primary fibers through the holes and attenuating the primary fibers within a forming tube by means of expanding gases from an attenuating flame that move the fibers in a stream within the forming tube toward a support;
introducing solid particles of additive material to the moving stream of fibers by entraining the particles in a stream of air having a major component of movement in the same direction as the direction of movement of the stream of attenuated fibers and introducing the stream of air into the stream of fibers in an area substantially adjacent the upstream end of the forming tube;
whereby the velocity of the expanding gases mixes the particles with the fibers in the stream to generally uniformly intermingle the fibers and the particles;
introducing heat curable liquid binder to the moving intermingled fibers and additive particles;
collecting a layer of the intermingled fibers and additive particles on the support; and
heating the layer of fibers, additive particles and liquid binder to cure the binder.

4. The process of claim 1, wherein the solid particles of additive material are hurled from a point substantially immediately beneath the rotor.

5. The process of claim 2, wherein the additive particles are directed generally radially outwardly from a point below the rotor.

6. The process of claims 1 or 3, wherein the fibers are glass fibers.

7. The process of claim 6, wherein the particles of additive material are comprised of cellulosic fibers.

8. The process of claim 7, wherein the cellulosic fibers are defibrated newsprint.

9. The process of claim 6, wherein the particles of additive material are comprised of mineral particles selected from one or more of the group consisting of expanded volcanic ash, expanded perlite and expanded vermiculite.

10. The process of claim 6, wherein a plurality of different types of additive particles are introduced to the moving fibers.

* * * * *